United States Patent Office 3,340,254
Patented Sept. 5, 1967

3,340,254
AMINO METHYLENE UREAS
Wolfgang Jentzsch and Matthias Seefelder, Ludwigshafen (Rhine), Germany, assignors to Badische Anilin- & Soda - Fabrik Aktiengesellschaft, Ludwigshafen (Rhine), Germany
No Drawing. Filed May 19, 1964, Ser. No. 368,705
Claims priority, application Germany, June 12, 1963, B 72,261
1 Claim. (Cl. 260—239.3)

This invention relates to the production of methyleneurea derivatives.

It is already known (British patent specification No. 917,642) that amidines and aryl isocyanates may be reacted according to the following equation:

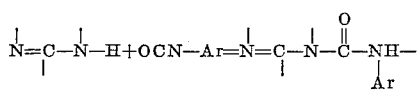

(Ar denoting an aryl radical) to form urea derivatives. The process has the disadvantage that amidines are not easily accessible. It is also known (Z. Arnold and J. Zemlicka, Chem. Listy, 52, 459 (1958), H. Eilingsfeld, M. Seefelder and H. Weidinger, Angew, Chemie 72, 836 (1960)) that dimethylformamide may be reacted with phosgene or thionyl chloride to form an amide chloride which may then be further reacted with ureas, for example according to the equation.

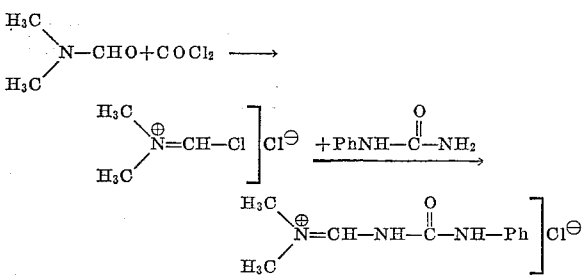

(Ph denoting a phenyl radical.) Only compounds which bear two alkyl radicals on one or both of the terminal nitrogen atoms are accessible in this way.

We have now found that urea derivatives having the general formula:

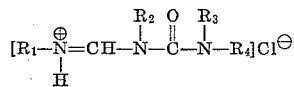

(in which $R_1$ denotes a substituted or unsubstituted alkyl, cycloalkyl, aryl or aralkyl radical and $R_2$, $R_3$ and $R_4$ may be identical or different and each denotes a hydrogen atom or a substituted or unsubstituted alkyl, cycloalkyl, aryl or aralkyl radical but all three do not denote aryl radicals at the same time, any two of the radicals $R_2$, $R_3$ and $R_4$ may be joined together to form a heterocyclic ring. $R_2$ may denote an alkoxyamino or dialkylamino radical) are obtained when a N-monosubstituted acid amide having the general formula:

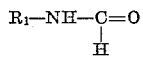

(in which $R_1$ has the above meaning) is reacted with thionyl chloride, phosgene or phosphorus oxychloride and a urea having the general formula:

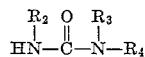

(in which $R_2$, $R_3$ and $R_4$ have the above meanings) and the free urea derivative is if desired liberated from the salt by adding an alkaline reagent, e.g. sodium hydroxide, potassium hydroxide, potassium carbonate, or sodium carbonate.

It is surprising that the said urea derivatives are obtained in this way because it is known from Helv. chim. acta 42, 1659 (1959), that acid chloride complexes of monosubstituted acid amides are very decomposable. It is also known from Ber. 68 B, 957 (1935) that the formation of either an amidine or an isonitrile takes place by the action of $SOCl_2$ on a N-monoarylamide and from Ber. 93, 239 (1960) that the reaction between N-monosubstituted acid amides and inorganic acid halides leads to isonitriles.

Examples of compounds which may be used as N-monosubstituted acid amides for the reaction according to this invention are: N-methylformamide, N-propylformamide, N-(3-methoxypropyl)-formamide, N-cyclohexylformamide, formanilide, p-chloroformanilide and formylbenzylamine.

The following compounds may be used for example as urea: urea, methylurea, cyclohexylurea, N,N'-dimethylurea, ethyleneurea, N,N'-trimethyleneurea, p-chlorophenylurea, N-methyl - N' - m-nitrophenylurea, N-cyclohexyl-N' - phenylurea, N,N'-di-n-butyl-N'-p-chlorophenylurea, N,N - tetramethylene-N'-benzylurea, N,N'-diphenylurea, N - phenyl-N'-methoxyurea, N,N'-tetramethylene-N'-ethoxyurea, 1,1-dimethyl-4-p-chlorophenylsemicarbazide and 1,1-dibenzyl-4-phenylsemicarbazide.

All the above compounds may bear the following radicals as substituents: halogen radicals, nitro radicals, alkoxy radicals, nitrilo radicals or dialkylamino radicals.

The following liquids may be used as reaction media: all solvents which are inert to the reaction components, for example acetone, ether, tetrahydrofurane, dioxane, chloroform, benzene, toluene and cyclohexane; excess of an alkylformamide may also be used as the reaction medium and this is advantageous particularly in the case of sparingly soluble ureas.

The reaction may be carried out with the reactants in the molar ratio 1:1:1. An excess of one or two reactants may also be used, for example an excess of phosgene of up to 100%. The reaction takes place violently at only room temperature (10 to 50° C.) and cooling to 0 to 10° C. is sometimes necessary; it may rapidly be concluded by subsequent slight heating, if necessary up to 100° C. The reaction temperature may thus vary within wide limits.

The reaction may for example be carried out as follows: Urea and acid amide, dissolved in a solvent, are advantageously placed in a suitable reactor and the gaseous or liquid acid chloride, possibly dissolved in a solvent, is gradually added. It is however also possible to react the acid chloride with the acid amide first and then to react the resultant mixture with the urea. The progress of reaction may easily be followed by the disengagement of gas.

Working up is very simple because the reaction products are usually insoluble in inert solvents. They may be filtered off, if necessary washed for a short time on the filter, and are usually sufficiently pure for further use without recrystallization. It is however also possible to add aqueous alkali solution to the reaction mixture so that the urea derivative is liberated and is taken up by the organic layer. The organic layer may then easily be separated from the aqueous solution and the urea derivative recovered by removing the solvent.

The urea derivatives and their salts obtainable by the process according to this invention are valuable active substances for herbicides and may also be used as intermediates for synthesis.

The reaction takes place according to the following equation:

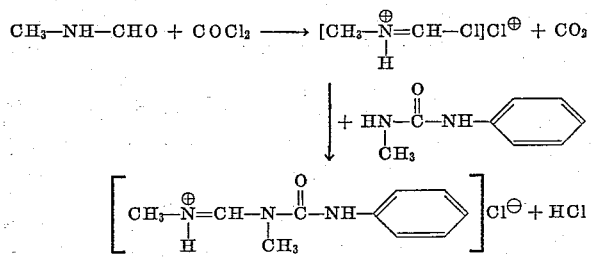

The invention is further illustrated by the following examples in which parts are by weight.

Example 1

272 parts of phenylurea and 130 parts of N-methylformamide are dissolved in 2000 parts of tetrahydrofurane and then a cooled solution of 250 parts of phosgene in 500 parts of tetrahydrofurane is gradually added while stirring. There is vigorous evolution of gas ($HCl+CO_2$) and heating up to about 40° C., and a thick white precipitate separates which, after three hours, is suction filtered and washed with 500 parts of acetone. The yield is 340 parts (79.8% of the theory). The melting point is 184° to 185° C.

Analysis, $C_9H_{12}ClN_3O$ (213.5).—Calculated: C, 50.6; H, 5.65; Cl, 16.6; N, 19.65; O, 7.5. Found: C, 50.6; H, 6.0; Cl, 16.7; N, 19.2; O, 8.1.

The product has the following structural formula:

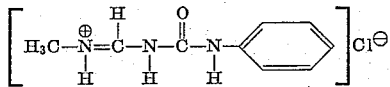

Example 2

176 parts of N,N'-dimethylurea and 192 parts of N-n-propylformamide are dissolved in 850 parts of tetrahydrofurane. 297 parts of thionyl chloride in 300 parts of tetrahydrofurane is dripped in at 30° to 35° C. and then the whole is stirred for another hour and suction filtered.

The yield is 322 parts (82.8% of the theory). The melting point is 172° to 174° C.

Analysis, $C_7H_{16}ClN_3O$ (193.5).—Calculated: C, 43.4; H, 8.25; Cl, 18.35; N, 21.7; O, 8.25. Found: C, 43.8; H, 8.4; Cl, 18.3; N, 20.9; O, 8.1.

The same product is obtained in a yield of 77.6% of the theory by using phosgene instead of thionyl chloride but under the same reaction conditions.

The product has the following structural formula:

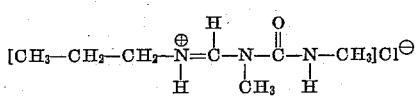

Example 3

176 parts of N,N'-dimethylurea, 130 parts of N-methylformamide and 260 parts of phosgene are reacted in the way described in Example 1. 287 parts of end product (87.4% of the theory) is obtained having a melting point of 182° to 183° C.

Analysis, $C_5H_{12}ClN_3O$ (165.5).—Calculated: C, 36.2; H, 7.25; Cl, 21.5; N, 25.3; O, 9.7. Found: C, 36.1; H, 7.7; Cl, 21.3; N, 24.6; O, 10.5.

Example 4

357 parts of thionyl chloride is dripped at 50° C. into a solution of 300 parts of N-methyl-N'-phenylurea and 147 parts of N-methylformamide in 1100 parts of tetrahydrofurane. When all has been added, the whole is stirred for another hour at 60° C. and then suction filtered and washed with 200 parts of tetrahydrofurane. The yield is 417 parts (92% of the theory) having a melting point of 154° to 155° C.

Analysis, $C_{10}H_{14}ClN_3O$ (227.5).—Calculated: C, 52.8; H, 6.2; Cl, 15.6; N, 18.5; O, 7.0. Found: C, 53.0; H, 6.3; Cl, 15.6; N, 18.6; O, 6.7.

The same compound is obtained in a yield of 86% by reacting 300 parts of N-methyl-N'-phenylurea, 147 parts of N-methylformamide and 396 parts of phosgene in 2500 parts of acetone at 30° to 40° C.

Example 5

332 parts of N-phenyl-N'-methoxyurea and 135 parts of N-methylformamide are dissolved in 2000 parts of toluene and then a solution of 240 parts of phosgene, dissolved in 600 parts of toluene, is gradually added at 20° to 45° C. Gas is disengaged and a crystalline precipitate separates which after an hour is suction filtered and washed with 500 parts of cold acetone on the filter. The yield is 439 parts (90% of the theory) having a melting point of 153° C.

Analysis, $C_{10}H_{14}ClN_3O$ (243.5).—Calculated: C, 49.4; H, 5.75; Cl, 14.6; H, 17.2; O, 13.2. Found: C, 49.5; H, 5.9; Cl, 14.3; H, 17.0; O, 13.5.

The product has the following structural formula:

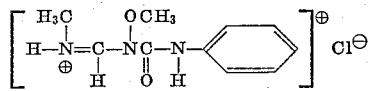

Example 6

332 parts of N-phenyl-N'-methoxyurea, 192 parts of N-n-propylformamide and 250 parts of phosgene are reacted in tetrahydrofurane as a solvent and worked up, all as described in Example 5.

The yield is 478 parts (88% of the theory) having a melting point of 144° to 145° C.

Analysis, $C_{12}H_{18}ClN_3O_2$ (271.5).—Calculated: C, 53.1; H, 6.1; Cl, 13.1; N, 15.4; O, 11.8. Found: C, 53.4; H, 6.9; Cl, 13.1; N, 14.4; O, 12.0.

Example 7

474 parts of N-n-butyl-N'-m-nitrophenylurea and 135 parts of N-methylformamide are dissolved in 4000 parts of dioxane and at 20° to 30° C. a solution of 250 parts of phosgene in 500 parts of dioxane is added. When the reaction is over, the clear solution is completely concentrated in vacuo. The remaining syrup (604 parts, 96.2% of the theory) becomes completely crystalline when ground with 500 parts of acetone. The melting point is 146 to 147° C.

The compound has the following structural formula:

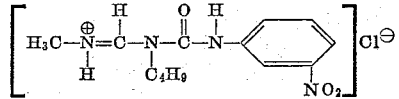

Analysis, $C_{13}H_{19}ClN_4O_3$ (314.5).—Calculated: C, 49.6; H, 6.05; Cl, 11.25; N, 17.8; O, 15.3. Found: C, 50.3; H, 6.1; Cl, 11.2; N, 17.3; O, 15.0.

Example 8

Gaseous phosgene, with nitrogen as a carrier gas, is passed at 30° to 40° C. into a solution of 272 parts of phenylurea and 192 parts of N-n-propylformamide in 2000 parts of tetrahydrofurane. The whole is then stirred at 40° C. for another two hours, suction filtered and washed with 500 parts of ether on the filter. The yield is 433 parts (89.7% of the theory) having a melting point of 160° to 162° C.

Analysis, $C_{11}H_{16}ClN_3O$ (241.5).—Calculated: C, 54.7; H, 6.6; Cl, 14.7; N, 17.4; O, 6.6. Found: C, 55.5; H, 6.9; Cl, 14.4; N, 16.8; O, 6.4.

Example 9

280 parts of phosgene dissolved in 500 parts of tetrahydrofurane is slowly added to 172 parts of ethyleneurea and 190 parts of N-n-propylformamide dissolved in 4000 parts of tetrahydrofurane, the whole is boiled for two hours, cooled, suction filtered and washed on the filter with 200 parts of tetrahydrofurane. The yield is 254 parts (65.6% of the theory) and the melting point is 228° to 229° C. (with decomposition).

Analysis, $C_7H_{14}ClN_3O$ (191.5).—Calculated: C, 43.9; H, 7.3; Cl, 18.5; N, 21.9; O, 8.4. Found: C, 44.0; H, 7.6; Cl, 18.4; N, 20.8; O, 9.5.

The product has the structural formula:

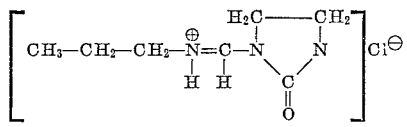

Example 10

260 parts of phosgene, dissolved in 300 parts of tetrahydrofurane, is gradually added at 30° to 40° C. to 176 parts of N,N'-dimethylurea dissolved in 500 parts of N-methylformamide. Two hours later, the whole is filtered by suction and washed with 200 parts of tetrahydrofurane. The yield is 260 parts (79.5% of the theory). The product is identical with that in Example 3.

Example 11

176 parts of N,N'-dimethylurea and 130 parts of N-methylformamide are dissolved in 3000 parts of tetrahydrofurane and then at 25° to 35° C. 384 parts of phosphorus oxychloride is gradually added; one hour after all has been added, the whole is suction filtered and 170 parts of the urea derivative is obtained having a melting point of 176° to 178° C. This is equivalent to a yield of 52.3% of the theory. The compound is identical with the compound obtained according to Example 3.

Example 12

176 parts of N,N'-dimethylurea and 280 parts of N-cyclohexylformamide are dissolved in 3000 parts of tetrahydrofurane and then a solution of 255 parts of phosgene in 300 parts of tetrahydrofurane is slowly added. The precipitate is then suction filtered and washed with 100 parts of tetrahydrofurane. 420 parts (90.2% of the theory) of urea derivative is obtained having a melting point of 184° to 185° C.

Analysis, $C_{10}H_{20}ClN_3O$ (233.5).—Calculated: C, 51.15; H, 8.55; Cl, 15.2; N, 17.95; O, 6.85. Found: C, 52.0; H, 9.3; Cl, 14.9; N, 17.9; O, 6.0.

Example 13

120 parts of urea is dissolved in 500 parts of N-methylformamide and at 35° to 40° C. a solution of 250 parts of phosgene in 300 parts of tetrahydrofurane is added. When the reaction is over, the whole is cooled to about 0° C. by means of an ice bath and then suction filtered, 147 parts of uprea derivative (53.5% of the theory) being obtained having a melting point of 164° to 160° C.

Analysis, $C_3H_8ClN_3O$ (137.5).—Calculated: C, 26.1; H, 5.8; Cl, 25.8; N, 30.5; O, 11.6. Found: C, 26.0; H, 6.0; Cl, 25.4; N, 29.0; O, 13.8.

Example 14

280 parts of N-cyclohexylformamide and 284 parts of cyclohexylurea are dissolved in 9000 parts of tetrahydrofurane and then a solution of 250 parts of phosgene in 500 parts of tetrahydrofurane is gradually added. After the reaction is over, the solvent is distilled off, 20% caustic soda solution is added to the remaining syrup until it has an alkaline reaction and the oil which separates is taken up in ether.

After the ether has been distilled off, 465 parts of a non-crystallizing syrup remains behind which is converted into the picrate by adding alcoholic picric acid solution. The picrate melts at 199° to 200° C. and shows the following analytical data:

Analysis, $C_{20}H_{28}N_6O_8$ (481).—Calculated: C, 50.0; H, 5.8; N, 17.5; O, 26.7. Found: C, 50.0; H, 6.0; N, 18.0; O, 26.3.

Example 15

205 parts of N-p-chlorophenyl-N'-methoxyurea and 133 parts of formanilide are dissolved in 2500 parts of ethyl acetate and reacted with 120 parts of phosgene. The resultant precipitate is washed on a suction filter with 1500 parts of cold acetone. The product obtained after drying (242 parts, 71% of the theory) has a melting point of 133° to 135° C.

Analysis, $C_{15}H_{15}Cl_2N_3O_2$ (340).—Calculated: N, 12.35; Cl, 20.8. Found: N, 12.0; Cl, 20.4.

Example 16

A solution of 44 parts of phosgene in 60 parts of ethyl acetate is cooled to 0° C. and gradually added in the course of one hour at 30° to 40° C. to a solution of 74 parts of N-methyl-N'-p-chlorophenylurea and 23.6 parts of methylformamide in 600 parts of ethyl acetate. When all has been added, stirring is continued for another two hours at 40° C., the whole cooled to 10° to 15° C. and 15% aqueous caustic soda solution is added until there is a clearly alkaline reaction. The organic phase is separated, dried, the solvent distilled off and the residue remaining is recrystallized from petroleum ether. 68 parts of the urea (75.5% of the theory) is obtained having a melting point of 86° to 88° C.

The urea has the following structural formula:

$$\begin{array}{c} CH_3 \quad CH_3 \\ | \quad\quad | \\ N=CH-N-C-NH-\!\!\!\!\bigcirc\!\!\!\!-Cl \\ \| \\ O \end{array}$$

Analysis, $C_{10}H_{12}ClN_3O$ (225.7).—Calculated: C, 53.2; H, 5.3; Cl, 15.7; N, 18.6; O, 7.1. Found: C, 53.1; H, 5.5; Cl, 15.6; N, 18.0; O, 8.0.

We claim:

A compound selected from the group consisting of (a) a compound having the formula

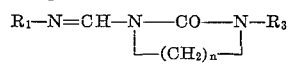

and (b) a compound having the formula

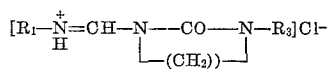

wherein $R_1$ is a member from the group consisting of lower alkyl, methoxypropyl, cyclohexyl, phenyl and chlorophenyl; $R_3$ is a member selected from the group consisting of hydrogen, ethoxy, and benzyl; and $n$ is 2, 3 or 4.

References Cited

UNITED STATES PATENTS

| | | | |
|---|---|---|---|
| 3,196,152 | 7/1965 | Wright et al. | 260—239 X |
| 3,242,209 | 3/1966 | Jentzsch et al. | 260—553 |

OTHER REFERENCES

Eilingsfeld et al., Angew. Chemie, volume 72 (1960), pages 836–845 (page 840 particularly relied on).

ALEX MAZEL, *Primary Examiner.*

J. H. TURNIPSEED, *Assistant Examiner.*